Figure 1:
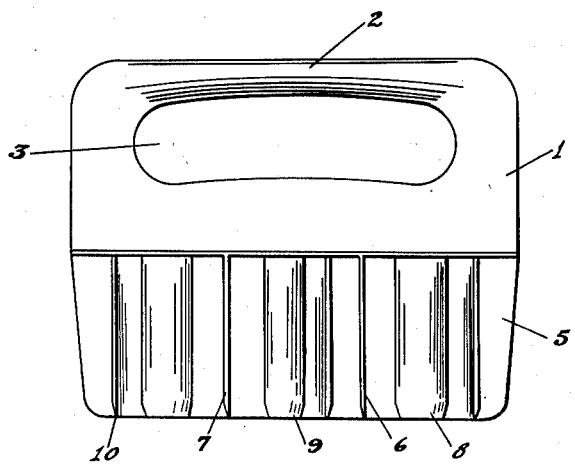
Figure 2:
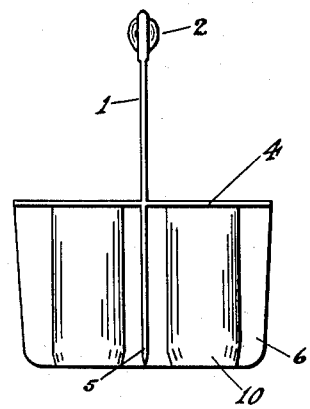
Figure 3:
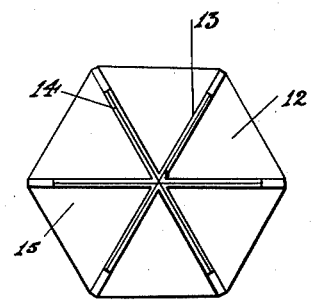
Figure 5:
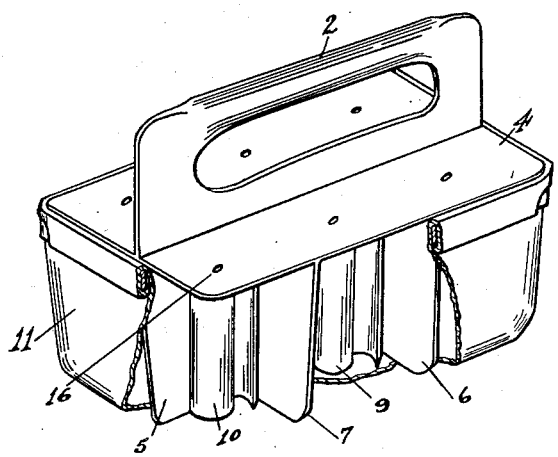
Figure 4:
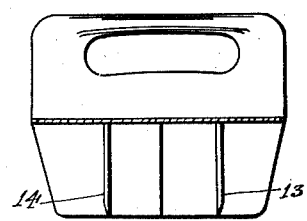
Figure 6:
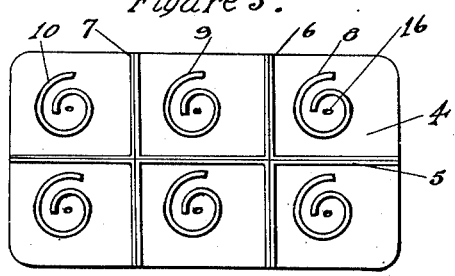

Feb. 11, 1930.                    W. E. BROEG                    1,746,521
                              DOUGH WORKING DEVICE
                                Filed July 8, 1927

William Edward Broeg.
Inventor.
W. a. Darrah
Attorney.

Patented Feb. 11, 1930

1,746,521

UNITED STATES PATENT OFFICE

WILLIAM EDWARD BROEG, OF CHICAGO, ILLINOIS

DOUGH-WORKING DEVICE

Application filed July 8, 1927. Serial No. 204,263.

This invention relates to apparatus for forming, cutting and treating dough and while it is particularly applicable to doughs used in the manufacture of buns, bread, biscuits, cakes and similar articles, it will be apparent that the same process and equipment may be employed in cutting and treating any plastic material having consistencies such that the apparatus may be employed.

Some of the objects of this invention are to provide a simple, inexpensive, economical equipment for forming and treating doughs with a minimum amount of labor. One common and advantageous application of this equipment is in connection with the forming of those articles of pastry known as buns or rolls and particularly that class in which the rolls or buns are treated with flavoring or seasoning ingredients as for example, cinnamon rolls or buns. The equipment or process by which the equipment is used provides a simple, economical and efficient manner of forming goods of this class, although it should be understood that many other obvious applications and advantages will be apparent from a consideration of this disclosure.

Referring to the drawing:—

Fig. I shows a side elevation of one form of my device;

Fig. II shows an end elevation of the device;

Fig. III shows a view from the underside of the modified form of my device;

Fig. IV shows a side elevation of another form of my device;

Fig. V shows a perspective view partly broken away of a form of my device similar to Fig. I in operating position in a container or pan.

Fig. VI shows a plan view from the underside of my device.

In the drawings (1) indicates a handle or holding device provided with a gripping member (2) and a hole (3) through which fingers may be inserted if desired. Attached to the handle member (1) is a horizontal deck or support (4) to which is attached a series of substantially vertical dividing planes or cutters those running longitudinally being indicated by (5) and those running transversely being indicated as (6 and 7). A series of specially formed cutters are provided in the spaces formed between the various vertical planes or cutters, these are indicated in the drawing by (8, 9 and 10). These specially formed cutting members are shown for purposes of illustration to be shaped as a spiral and are constructed of substantially vertical thin walls attached at their upper end to a horizontal member (4). A pan (11) is provided with a contour which corresponds to the outline of the complete cutting tool. Pan (11) is provided with tapered walls the taper of which may to advantage be approximately the same as the taper on the vertical cutting members (5, 6 and 7).

In the device shown in Fig. III it will be noted that the modified construction is shown, the horizontal member being indicated by (12) and the vertical cutting members by (13, 14 and 15), the combination forming an hexagonal group. Obviously many desired shapes and arrangements can be constructed, the essential features being that the cutters divide the entire group or mass of dough into a series of smaller particles of the desired shape and size, while the irregular shape cutters serve to make an irregular shape within the central portion of the smaller particles of dough.

In using this device I have found that very good results are obtained by first dipping the lower portion of the device in a mixture of material, as for example fat, sugar and spice. The cutter is then forced into the pan containing the dough and it will be obvious that it will cause cuts or grooves substantially through the depth of the dough in the form of the contour of the vertical cutting surfaces. This will result, after withdrawal of the cutting device, in dividing the dough into a series of smaller particles and the central spiral shaped cutters will form a spiral shaped depression in the central portion of the individual lumps of dough. It will be apparent that all of the cuts or depressions will become filled with the mixture of fat, sugar and spice or whatever mixture may be employed. The resultant product will, therefore, be the manufacture of a multiple of small buns of one large lump of dough and the filling of the central portion of the buns with the usual ingredients of fat, sugar and spice. All of this operation will, of course, be accomplished by the single motion on the part of the operator. As a contrast to this method of manufacturing buns or similar articles, it should be pointed out that at present bakers take small particles of dough, roll out strips or rolls and then coil up the strips or rolls after using the fat, sugar and spice on the outer surface.

The resultant operation by the equipment which I have indicated gives a tremendous saving in labor and, therefore, in cost, insuring a more controllable product and a more uniform product.

It will be apparent that any desired ingredients may be added to the cutter and I do not wish to be confined to the mixture of fat, sugar and spice previously mentioned. It will also be apparent that any desired shape, or contour may be given to the individual cutter, the contours shown being indicated principally because it imitates the present commercial shape of buns or rolls.

In the case of those doughs which are sticky or tend to trap air, I have provided a vent indicated by (16) to allow air to escape from the central portion of the various cutting pockets. In many shapes or forms this is not necessary, however.

It will be noted that there are two types of cutting elements used in my equipment. One type consists of the knives or blades which divide the dough into a multiple of individual pieces or lumps, while the second type is indicated by the spiral shaped members (8, 9 or 10) and do not divide the dough in the sense that one piece is divided from another piece, but merely form slots or depressions in the dough. The object will be apparent in that it is intended that the dividing members such as (5, 6 and 7) will cut or separate the dough into individual pieces which when the dough is baked will readily come apart as individual units forming what is known as buns, rolls or biscuits. On the other hand, the members typified by (8, 9 and 10) are indicated to form depressions or slots in the individual rolls, buns or biscuits, the slots being intended to contain either flavoring or decorative material, or both.

It will therefore be apparent that two different functions are combined in the cutter member as shown although either one may be carried out singly or both jointly without departing from the scope of my invention.

Having now fully described my invention what I claim as new and wish to secure by Letters Patent in the United States is as follows:

1. The process of manipulating dough which consists in inserting in said dough a cutter coated with a mixture of fat, sugar and spice, said mixture coalescing with the dough and preventing the formation of a permanent boundary line at the point where inserted.

2. The process of treating dough which consists in inserting in said dough while confined within a container a cutter coated with a mixture of fat, sugar and spice, forcing said cutter through said dough while in said container and finally withdrawing said cutter leaving said dough with insertions of said materials.

3. A dough manipulating device consisting of a cutter formed of a series of substantially plain shearing blades and a series of spirally shaped perforating blades located substantially symmetrical in the space between said shearing blades, said spiral perforating blades being arranged with their cutting edges in substantially the same plane as the cutting edges of the shearing blades and having their cutting edges turned inward toward the central point of the spiral.

4. In a dough manipulating device a cutting member consisting of a multiple of shearing blades and a multiple of perforating blades being arranged in the form of a spiral with their cutting edges in substantially the same plane as the cutting edges of the perforating blades, the cutting edge of said perforating blades being curved inwards toward the central point of the spiral.

5. In a dough working device a perforating blade having a substantially spiral shape, the cutting edges of said perforating blade being curved inward toward a central point.

6. In a dough working device a substantially spiral perforating blade having its lower edges curved inward.

7. The process of treating dough while in a container which consists in inserting in said dough a cutter coated with a mixture of fat, sugar and spice and then forcing said cutter through said dough while in said container.

WILLIAM EDWARD BROEG.